Figure 8:
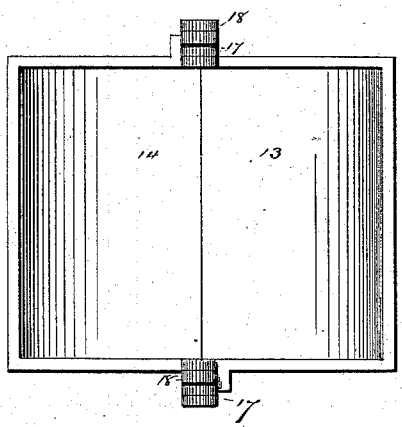

(No Model.)　　　　　　H. H. OLDS.　　　　5 Sheets—Sheet 1.
MACHINE FOR ROLLING PIE CRUST.
No. 293,504.　　　　　　　　Patented Feb. 12, 1884.
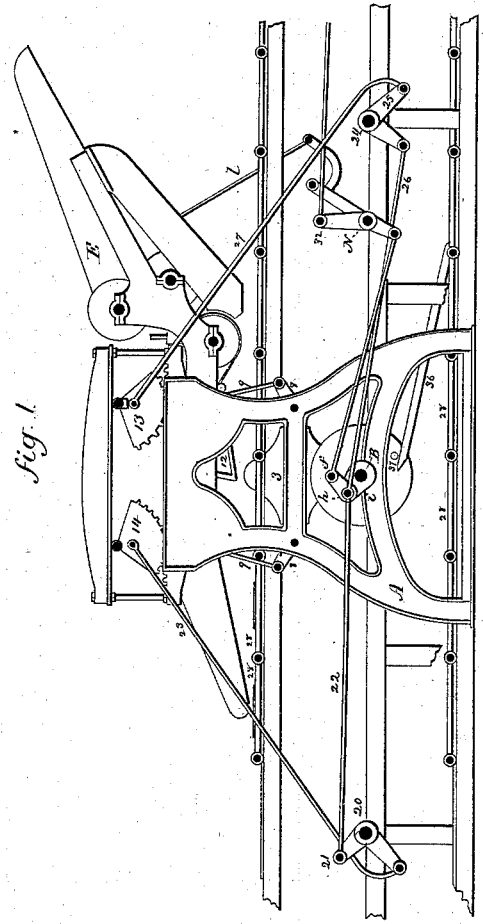
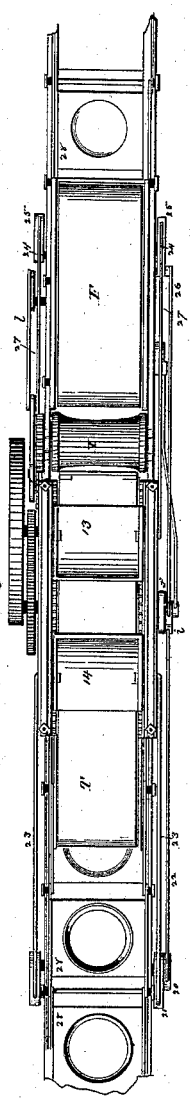
Witnesses.　　　　　　　　　　　　　Henry H. Olds, Inventor
　　　　　　　　　　　　　　　　　By Atty.

(No Model.)  5 Sheets—Sheet 2.
H. H. OLDS.
MACHINE FOR ROLLING PIE CRUST.
No. 293,504. Patented Feb. 12, 1884.
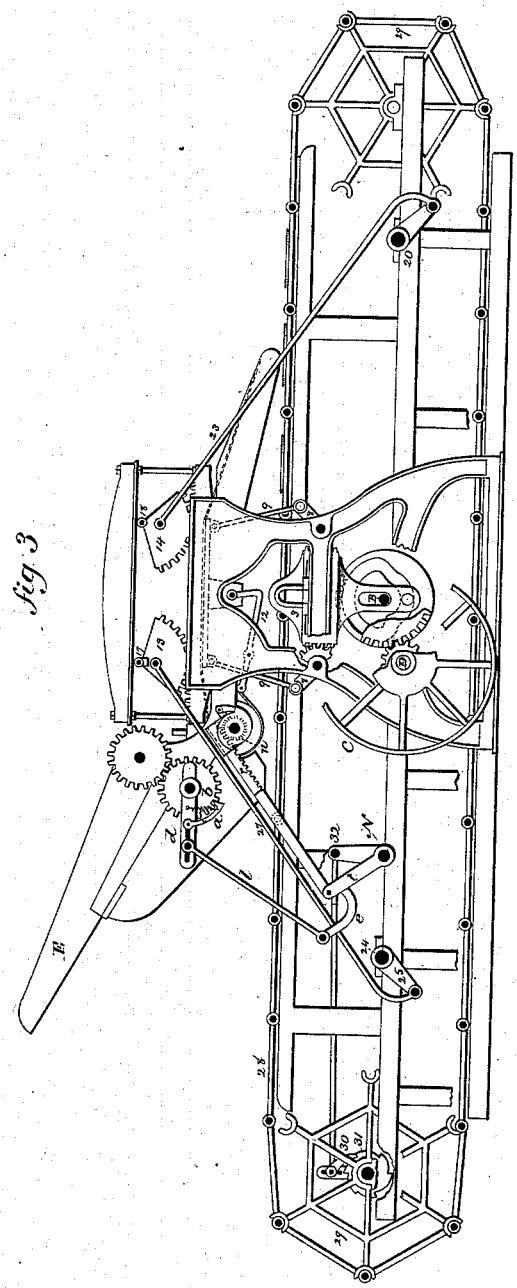

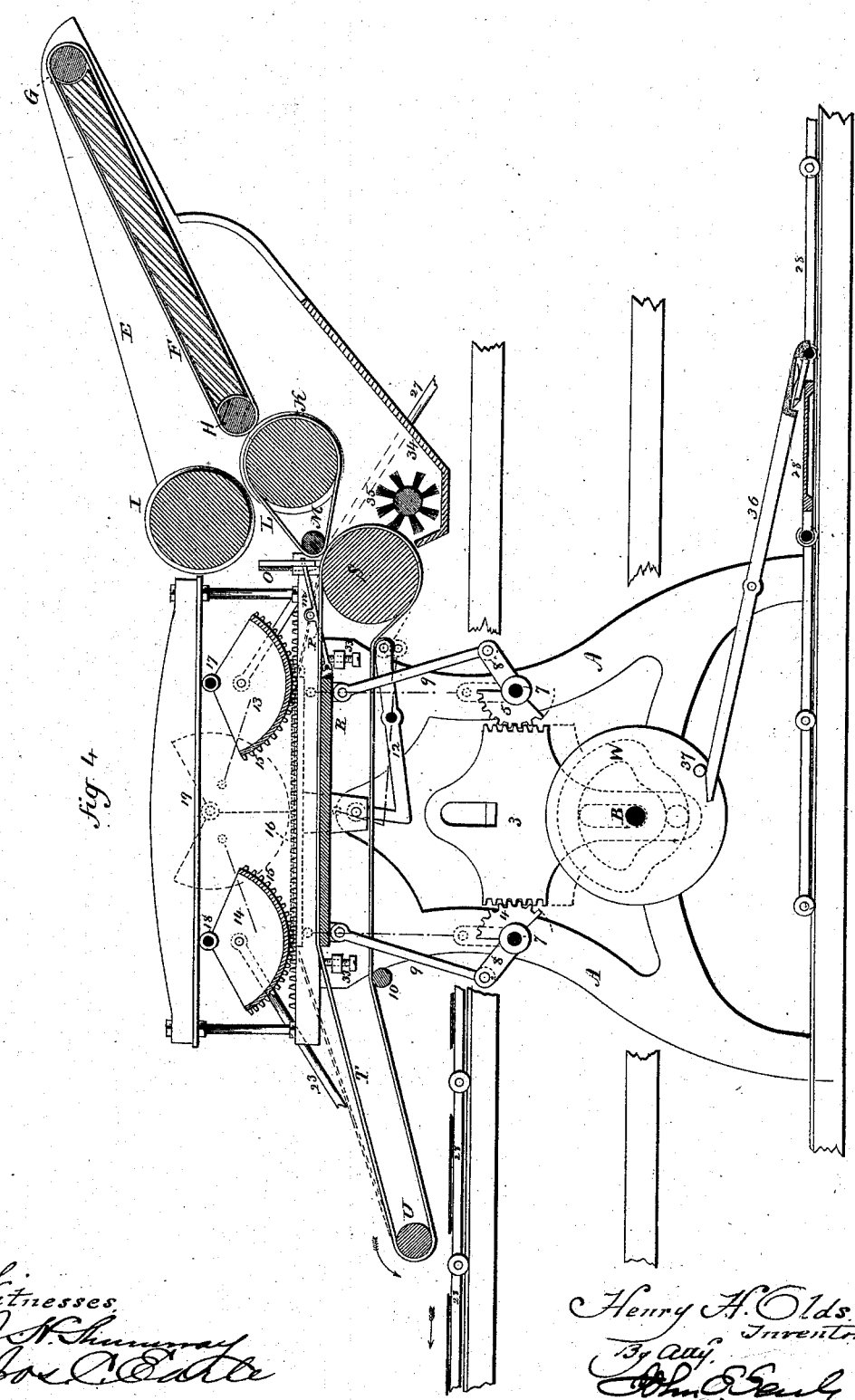

(No Model.) 5 Sheets—Sheet 4.
H. H. OLDS.
MACHINE FOR ROLLING PIE CRUST.
No. 293,504. Patented Feb. 12, 1884.
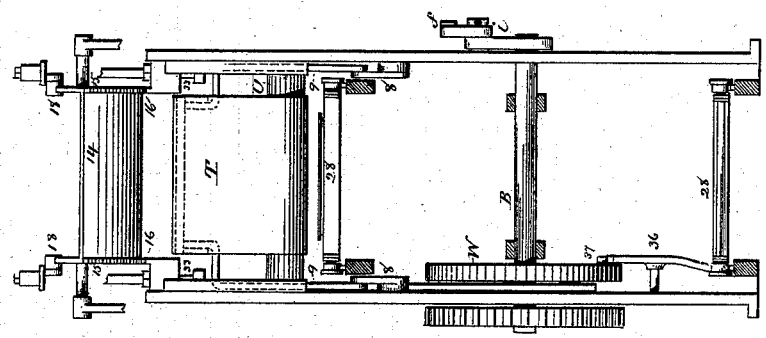
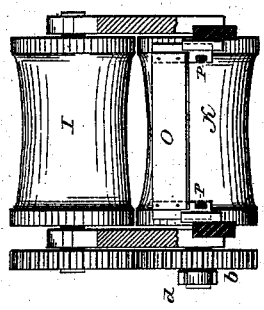
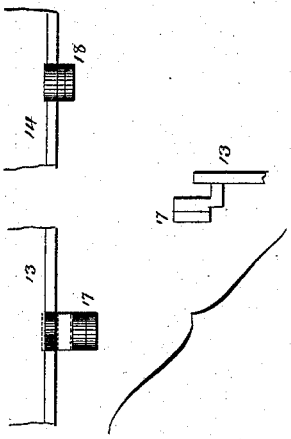

(No Model.)

H. H. OLDS.
MACHINE FOR ROLLING PIE CRUST.

No. 293,504. Patented Feb. 12, 1884.

5 Sheets—Sheet 5.

UNITED STATES PATENT OFFICE.

HENRY H. OLDS, OF NEW HAVEN, CONNECTICUT.

MACHINE FOR ROLLING PIE-CRUST.

SPECIFICATION forming part of Letters Patent No. 293,504, dated February 12, 1884.

Application filed April 2, 1883. (No model.)

*To all whom it may concern:*

Be it known that I, HENRY H. OLDS, of New Haven, in the county of New Haven and State of Connecticut, have invented a new Improvement in Machines for Rolling Pie-Crust; and I do hereby declare the following, when taken in connection with accompanying drawings and the letters of reference marked thereon, to be a full, clear, and exact description of the same, and which said drawings constitute part of this specification, and represent, in—

Figure 1, a side view; Fig. 2, a top view; Fig. 3, an opposite side view; Fig. 4, a longitudinal section; Figs. 5, 6, and 7, detached views; Fig. 8, a top view of the rollers brought together at the center, showing the anti-friction rolls brought into the same axial line.

This invention relates to an improvement in a machine for rolling the dough for pie-crust, the object of the invention being the construction of a machine which shall take the requisite quantity of dough in the "cake," roll it to the required thickness, and lay it upon the plate—work which has hitherto been done by hand; and the invention consists, principally, in a hopper arranged to deliver the mass of dough to feed-rolls, where the requisite quantity is cut off, delivered upon a table, presented to rollers, which roll it out to the required thickness and shape, and from which it is carried and automatically laid upon the plate, as more fully hereinafter described, and particularly recited in the claims.

A represents the frame of the machine, which supports the operative mechanism; B, the main shaft, supported in suitable bearings in the frame, and to which power is directly applied, or may be, as represented, by means of a pulley, C, on the counter-shaft D, carrying a pinion working into a corresponding gear on the main shaft B, as seen in Fig. 3.

E is the hopper into which the mass of prepared dough is placed. The bottom of this hopper is the upper run of an endless apron, F, running over a roll, G, at the upper end and H at the lower end. Adjacent to the lower roll, H, are a pair of feed-rolls, I K. The lower feed-roll, K, carries an endless apron, L, which passes around a roll, M. The bottom of the hopper and the apron thereon are inclined toward the feed-rolls, and so that the mass of dough lying on the apron is forced toward the feed-rolls by its own gravity. An intermittent rotation is imparted to one of the feed-rolls, K, by means of a pawl, a, working into a toothed ratchet-wheel, b, on the end of the shaft of the roll K, as seen in Fig. 3. The pawl a is hung to a lever, d, which lever has its fulcrum on the shaft of the roll, so as to swing thereon as its center of motion. A vibratory movement is imparted to the lever d through an arm, e, extending from a rockshaft, N, a rocking motion being imparted to this shaft from a crank, f, on the main shaft B, as seen in Figs. 1 and 3. This crank f may be an eccentric applied directly to the shaft; but as here represented it is an auxiliary crank hung upon the crank-pin H of a crank, i, the purpose of which crank i will be hereinafter indicated.

The length of the throw of the pawl a is adjusted by means of a slot in the lever, and in which the rod l, which connects the arm e through the lever d, is fixed, so that at each rotation of the main shaft a forward or advancing movement is imparted to the feed-rolls, and these rolls, having received the dough from the hopper, will deliver a certain amount, according to their extent of rotation. The surface of these rolls is concave longitudinally, as seen in Fig. 5, so that the space between the rolls is elliptical, and rolls the dough into that shape, the dough passing through the rolls onto the apron L until it arrives at the cutter O. This cutter O stands parallel with the axis of the feed-rolls and just in advance of the roll M, and so that the dough which is delivered by the apron L passes beneath the cutter; and when the requisite quantity has been fed, as before described, the cutter descends and separates the mass, (commonly called a "cake," which is the amount required for the crust of a single pie. The up-and-down reciprocating movement is imparted to this cutter by means of a lever, P, hung upon a fulcrum, m, on the frame, (see Fig. 4,) one arm of the lever being connected to the cutter-slide, as seen in Figs. 4 and 5, the other to the table R, which table has an up-and-down reciprocating movement imparted to it, as hereinafter described, and so that as the table descends the cutter rises, and as the table ascends the cutter descends and cuts off the cake.

S is a feed-roll for delivering the cake to be rolled. It carries an endless apron, T, the upper run of which passes over the table R, around a roller, U, at the opposite side of the table, and returns beneath the table R, as seen in Fig. 4. An intermittent rotary movement is imparted to the feed-roll S from an arm, t, on the rock-shaft N. To this arm t one end of a toothed rack, r, is hung, the teeth of the rack working into a corresponding pinion, n, on the shaft of the feed-roll S. The pinion n is loose on the shaft of the roll S, but is provided with a pawl, which engages a ratchet fast to the shaft or roll S, and so that as the rock-shaft imparts a forward movement to the rack r the pawl will engage the roll and cause the roll to revolve to the extent of the forward movement of the rack. Then, as the rock-shaft returns, the rack is drawn backward and returns the wheel, the pawl escaping from the teeth of the ratchet, so that the roll remains stationary while the rack is returning. This is a well-known device for imparting intermittent rotary movement to a shaft or roll. By this intermittent rotary movement, the dough is fed by the feed-rolls I K to deliver the requisite quantity for a cake, the previously-cut cake falls upon the apron T, and is carried by it over the table R and delivered at about the center of that table. The rotation of the roll S is therefore considerably greater than that of the feed-roll K. When the cake has been delivered at a point centrally over the table R, the table is raised, as seen in broken lines, Fig. 4, taking with it the apron and the cake thereon. This raising of the table is produced by a grooved cam, W, on the main shaft B. This cam operates a vertically-movable two-sided rack, 3, the rack on one side working into a segment, 4, and the opposite side into a segment, 5, the said segments fixed, respectively, to rock-shafts 7, so that in the operation of the cam an oscillating movement is imparted to the rock-shafts, and this movement is imparted to the table by arms 8 on the respective rock-shafts through connecting-rods 9, (see Fig. 4,) and so that as the cam operates in one direction it will raise the table, and in the opposite it will lower the table. As represented in Fig. 4, the table is down; then as the cam W revolves it draws down the rack 3, imparting to the arms 8 a corresponding forward movement, causing the table to rise, as seen in broken lines, Fig. 4. As this upward movement of the table will to some extent take up the apron T, it is necessary that the apron should give way on the lower run for such rising. To this end the lower run of the apron passes over a fixed roller, 10, at one side, and on the opposite side over a swinging roll, 11. This roll 11 is hung in one end of levers 12, the other end of the levers hung to the table, as shown, and so that as the table rises the roll 11 will give way and permit the lower run of the apron to slacken, as shown in broken lines, Fig. 4; or when the table drops, then the roll 11 will again rise and take the slack which will be produced by the descent of the table. The cake thus presented at the center over the table is in position to be rolled.

13 14 represent the two rollers. These rollers are segments of cylinders, and at their extreme ends are fitted with a segment-gear, 15, the said segments working in a horizontal rack, 16. (See Figs. 4 and 6.) At each end and on the axis of the rollers 13 14 anti-friction rollers, respectively 17 and 18, are arranged, which work upon the under side of a horizontal bar, 19, the said bar serving to hold the rollers 13 and 14 down into their respective racks, and so that as the rollers are oscillated on the racks the anti-friction rolls 17 18 will travel upon the under surface of the bar 19, as indicated in broken lines, Fig. 4. When the cake has been presented at the center, as before described, the two segment-rollers 13 14 are brought together, as seen in broken lines, Fig. 4, their surfaces just meeting at the center over the cake. Then the table is raised, as before described, bringing the apron T up toward the surface of the rollers and to a distance therefrom corresponding to the thickness of the crust to be rolled; and when the cake is thus presented the two rollers 13 and 14 separate and pass in opposite directions, pressing the cake down upon the apron T and rolling it out to the required thickness. The oscillating movement of the rollers 13 and 14 is imparted by the crank i on the main shaft B, as seen in Fig. 1.

The rock-shaft 20 carries a bell-crank lever, 21, with one arm of which a rod, 22, connects with the crank i, and from the other arm a rod, 23, connects with the roller 14. At the opposite side is a similar rock-shaft, 24, carrying a bell-crank lever, 25, one arm of which is connected by a rod, 26, with the crank i, the other arm by a rod, 27, with the roller 13, and so that as the main shaft revolves each revolution will impart a full oscillating movement to the rollers 13 and 14, bringing them together, as seen in broken lines, Fig. 4, at the center, then rolling them outward to their extreme position, as shown. In order that the rollers 13 and 14 may come completely together, and so that their surface is a continuous circle, that is brought into the same axial line, the rollers 17 and 18 are offset the one from the other, so that one may pass the other, as seen in Figs. 7 and 8. After the crust has been thus rolled, the next feed made, as before described, takes the rolled crust from over the table and presents a new cake for the rolling operation, and so on until the rolled crust passes off from the apron T over the roll U. To automatically present the plates to receive the crust so delivered from the apron, I arrange an endless traveling-carriage, which consists of a series of plate-holders, 28, hinged together in the form of a chain, and which passes over wheels 29 at each end, the wheels being constructed to engage the links, or parts of the carriage, in the usual manner for this class of carrying devices. An intermittent rotary movement is imparted to one of the wheels 29 by means of a pawl, 30, and a ratchet, 31, the said pawl actuated by an arm, 32, on the rock-shaft N, as seen in Fig. 3, the extent of feed being such that one of the plate-holders 28 will be presented to the delivery-point from the apron at each movement; and the movement of the plates in the direction indicated by the arrow, Fig. 4, corresponds to the movement of the apron T, so that as the advancing edge of the crust passes down from the apron T it will come upon a corresponding edge of the plate, and then, as the plate and apron continue their movement, the plate will take the crust as it passes from the apron, the plate thus crusted will pass on, and a second be presented, and so continuing, and as the plates thus crusted are delivered they are removed to be filled. When working, at each revolution or operation the dough for a cake is fed, the cake cut off, a previously-cut cake is rolled to form the crust, and a previously-rolled crust is delivered to the plate.

To adjust the thickness of the crust the frame or support between which the rollers 13 and 14 work is made vertically adjustable with relation to the table by means of set-screws 33, or otherwise; or the table itself may be made adjustable with relation to the rollers.

To prevent the crust sticking to the apron T, I provide a hopper, 34, in which is a revolving brush, 35. Flour is placed in this hopper, so that the brush revolves in it, and the brush also revolves in contact with the surface of the apron T, and preferably as it passes over the feed-roll S, thus flouring the surface of the apron before it is to receive the cake.

As the movement of the plate-carriage is considerable, and the weight of the plates thereon such as would impart some momentum to the carriage, I find it desirable to provide a stop which will arrest the carriage at the termination of each advancing movement. To do this, I provide a dog, 36, which will engage one of the links or some corresponding projection on the carriage, as seen in Fig. 4, as its extreme movement is completed. Then, just before the movement of the carriage begins, the dog is tripped by a stud, 37, on the cam W or otherwise, releasing the carriage and permitting its movement, and then return to engage the carriage as it completes its movement.

It will be understood that the plates which are to receive the crust are placed upon the carriage upon the side opposite that where the apron T delivers the crust.

As thus described, the machine places the crust directly upon the plate. After the pies have been filled the upper crust may be applied in like manner by simply placing the pie upon the apron, as hereinbefore described for the plate, the filled pie receiving the upper crust as the plate did the under crust.

If different-sized plates are required, or different quantities, or any adjustment of the parts, it will be understood that they are made in the usual method of making adjustments in similar machinery.

Instead of employing the feeding device for forming and delivering the cake which I have described, the cake may be prepared independent of the machine, and placed—say by hand—on the table.

I have represented the cutter as operated by connection with the table, and also the tightener 11, and prefer this construction; but they may be otherwise operated, and the intermittent movement of the feeding devices may be each operated independently instead of by the single crank on the main shaft. I therefore do not wish to limit my invention to the particular devices by which such movements are imparted.

I claim—

1. In a pie-crust-rolling machine, the combination of the main frame, a table, and two segmental rollers supported therein, substantially as described, said rollers being constructed and mounted substantially as described, whereby they may be brought together to form a continuous cylindrical surface on their under side, and means, substantially such as described, for rolling the said rollers in opposite directions, substantially as set forth.

2. The two segmental-shaped rollers, each being provided with a toothed segment and a bearing on their respective axes, a horizontal rack, a horizontal bar parallel with the rack, the rollers, rack, and bar, combined substantially as described, whereby the toothed segments shall engage the rack and the said bearings work against the said horizontal bar, with mechanism, substantially such as described, to impart a movement to the rollers toward and from each other, and a table, as and for the purpose set forth.

3. The combination of a table, an endless apron, supports, substantially such as described, whereby the said apron may pass over said table, two segment-shaped rollers, and mechanism, substantially such as described, to impart an oscillatory or rolling movement to said rollers in a plane parallel with said table, substantially as described.

4. The combination of a table, an endless apron, supports, substantially such as described, whereby the said apron may pass over said table, two segment-shaped rollers, mechanism, substantially such as described, to impart an oscillatory or rolling movement to said rollers in a plane parallel with the plane of said table, and mechanism, substantially such as described, to impart to said table an up-and-down movement toward and from said rollers, substantially as described.

5. The combination of a table, an endless apron, supports, substantially such as described, whereby the said apron may pass over said table, two segment-shaped rollers, mechanism, substantially such as described, to impart an oscillatory or rolling movement to said rollers in a plane parallel with the plane of said table, and the pair of feed-rolls I K, and the cutter O, substantially as described.

6. The combination of a table, an endless apron, supports, substantially such as described, whereby the said apron may pass over said table, the segment-shaped rollers, mechanism, substantially such as described, to impart an oscillatory or rolling movement to said rollers in a plane parallel with the plane of said table, the pair of feed-rolls I K, the cutter O, the hopper, and endless apron F therein, substantially as described.

7. The combination of a table, an endless apron, supports, substantially such as described, whereby the said apron may pass over said table, two segment-shaped rollers, and mechanism, substantially such as described, to impart an oscillatory or rolling movement to said rollers in a plane parallel with said table, with the intermittently-moving carriage, arranged to present the plates to receive the crust, substantially as described.

8. The combination of a table, an endless apron, supports, substantially such as described, whereby the said apron may pass over said table, two segment-shaped rollers, mechanism, substantially such as described, to impart an oscillatory or rolling movement to said rollers in a plane parallel with said table, mechanism, substantially such as described, to impart to said table an up-and-down movement toward and from said rollers, and the adjusting-roll 11, over which the lower run of said apron T passes, said roll connected to the table, substantially as and for the purpose described.

9. The combination of a table, an endless apron, supports, substantially such as described, whereby the said apron may pass over said table, two segment-shaped rollers, mechanism, substantially such as described, to impart an oscillatory or rolling movement to said rollers in a plane parallel with the plane of said table, a carriage, and mechanism, substantially such as described, to impart intermittent movement to said carriage, to present the plates to receive the crust, and a dog, 36, to arrest and hold said carriage, substantially as described.

HENRY H. OLDS.

Witnesses:
JOHN E. EARLE,
LILLIAN D. KELSEY.